United States Patent [19]

Lange et al.

[11] 3,959,696

[45] May 25, 1976

[54] OVER VOLTAGE ARRESTER

[75] Inventors: Gerhard Lange; Gerhard Peche, both of Berlin, Germany

[73] Assignee: Siemens Aktiengesellschaft, Berlin & Munich, Germany

[22] Filed: Feb. 8, 1973

[21] Appl. No.: 330,886

[30] Foreign Application Priority Data

Feb. 15, 1972 Germany............................ 2207009

[52] U.S. Cl.................................. 317/62; 313/198; 313/218

[51] Int. Cl.$^2$ ........................................... H02H 9/06

[58] Field of Search.................... 313/198, 218, 197; 317/61, 62

[56] References Cited

UNITED STATES PATENTS

| | | | |
|---|---|---|---|
| 2,938,137 | 5/1960 | Reger et al. | 313/198 X |
| 3,588,576 | 6/1971 | Kawiecki | 317/61 X |
| 3,676,743 | 7/1972 | Bahr et al. | 317/61 |

*Primary Examiner*—William M. Shoop
*Assistant Examiner*—Harry Moose
*Attorney, Agent, or Firm*—Hill, Gross, Simpson, Van Santen, Steadman, Chiara & Simpson

[57] ABSTRACT

An over voltage arrester is formed with electrodes inserted into the ends of a tubular insulator member and assembled in gas-tight relationship by glazing the electrodes to the insulator member, at least one of the electrodes being in direct electrical contact with a conductive triggering strip supported on the tubular insulator member, such triggering strip being in direct contact with the electrode in the area of the glazed connection between the electrode and the insulator member.

9 Claims, 3 Drawing Figures

OVER VOLTAGE ARRESTER

BACKGROUND OF THE INVENTION

1. Field of the Invention

The present invention relates to an over voltage arrester and more particularly to such an arrester formed with a gas-tight housing with two electrodes supported by opposite ends of a tubular insulator member.

2. The Prior Art

Over voltage arresters are employed to trigger a discharge path between two electrodes when a voltage applied between the electrodes increases beyond a predetermined level. In order to provide a specific triggering voltage at which such arresters become operative, the interior of such an arrester is typically filled with a specific gas mixture, at a relatively low pressure, and has one or more conductive triggering strips or lines supported on the interior of the tubular insulator member which supports the electrodes. The strip must be in electrical contact with one of the electrodes, and extends from that electrode for a short distance toward the other electrode, along the surface of the tubular insulator member. The triggering of the gas-discharge path, when the arrester becomes operative, is facilitated by means of the conductive triggering strip or line. The use of radioactive materials with such arresters is avoided as much as possible. The triggering strips are typically applied to the tubular insulator member in the same manner as with luminescent tubes.

Over voltage arresters are designed to trigger as rapidly as possible in response to a rapidly increasing over voltage condition. In the arresters which are currently available employ one or more triggering lines which are soldered to one of the electrodes by the use of a metallic solder.

It has not been possible to use such triggering lines with arresters having insulators formed of glass or glazed ceramic materials, because it has not been possible to establish electrical contact between the triggering lines and the electrodes. The resistance of the triggering lines must be above 5,000 ohms, for the arresters to function properly, but the processes for establishing the required electrical connection of the triggering lines to an electrode by hard soldering are disadvantageous either because they lower the resistance of the triggering lines or of the tubular insulating member or because they are unduly costly. When ordinary solder or silver solder is used while a partial vacuum or reduced pressure is maintained within the arrester, the vapour pressure of the solder is so great that part of the solder is vaporized and condenses on the interior of the insulator member. The insulation resistance of the ceramic insulator falls below $10^8$ ohms after such an assembly, with knob type arresters, which is too low for normal operation. This disadvantage can be prevented only by use of a very costly manufacturing process employing a solder with a very low vapour pressure such as pure gold, or else the arrester is first soldered while the interior thereof is filled with pressurized hydrogen gas, to suppress vaporization of the solder, after which the excess hydrogen gas is removed in a high-vacuum at a low temperature, by diffusion through a platinum wall.

It is, therefore, desirable to provide a means for forming a suitable over voltage arrester employing a ceramic or glass insulator member which avoids the disadvantages of the prior art.

SUMMARY OF THE INVENTION

It is a principal object of the present invention to provide an over voltage arrester in which triggering lines are formed in a simple and inexpensive manner.

Another object of the present invention is to provide an over voltage arrester in which the formation of the triggering lines does not reduce the effectiveness of the arrester.

These and other objects and advantages of the present invention will become manifest upon an examination of the following description and the accompanying drawings.

It has not been appreciated heretofore, that a glass or ceramic insulator tube may be connected in gas-tight relationship with a metal electrode by glazing or fusing the insulator to the electrode, through the application of heat, and that a conductive triggering line supported on the insulator surface can in this way be electrically connected with the electrode. However, we have discovered that, surprisingly, even when molten glass is used as a connecting material between the insulator tube and the electrode, the required electrical contact is established.

In one embodiment of the present invention an over voltage arrester is provided in which the electrodes are glazed to the ends of a tubular insulator member, and a triggering line formed on the surface of the insulator member is in direct contact with the electrode at the glazed junction between the electrode and the insulator member. The electrically conductive triggering strip preferably consists of a mixture of low melting glass solder and a graphite suspension known as hydrokollag.

The present invention embraces a method of producing such an over voltage arrester, comprising the steps of firmly applying an electrode to the surface of the insulator member at a place where a strip of electrically conductive material is supported by the insulator member, and glazing the electrode to the insulator member at that location.

BRIEF DESCRIPTION OF THE DRAWINGS

Reference will now be made to the accompanying drawings in which.

DESCRIPTION OF THE PREFERRED EMBODIMENTS

Figure 1:
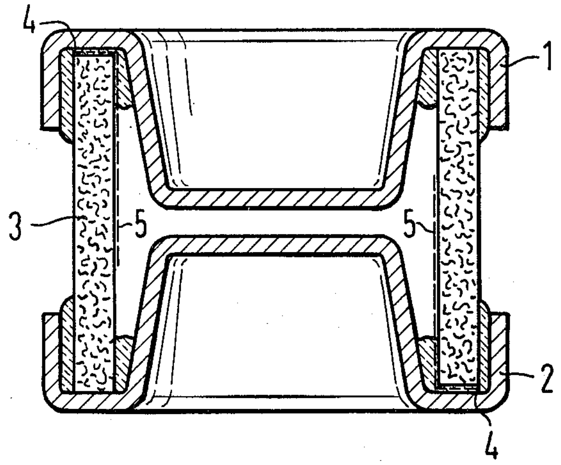
FIG. 1 is a longitudinal cross-sectional view of an over voltage arrester incorporating an illustrative embodiment of the present invention.

In the arrester illustrated in FIG. 1, two end electrodes 1 and 2 are provided at opposite ends of a tubular insulator member 3. A triggering strip or line 5 (shown in dotted lines in the drawings), formed by applying a graphite suspension to the surface of the insulator member 3, is supported on the inside of the insulator member 3, and extends from one end of the insulator member, part way toward the other end. A plurality of the lines 5 may be formed, and in the embodiment of FIG. 1, both the electrodes 1 and 2 are connected to individual ones of the lines 5.

The electrodes 1 and 2 are secured to the insulator tube 3, formed of ceramic material, by a melting process, in which molten glass is interposed between the electrodes 1 and 2 and the insulator tube 3, and the assembly pressed together while the glass is molten in order to form a rigid assembly. The electrodes 1 and 2 must be connected to the insulator member 3 in gas-tight relationship, so as to maintain a reduced gas pressure within the interior of the arrester. The triggering line 5 incorporates a resistance which is greater than 5,000 ohms.

The triggering line is preferably formed of a mixture of three parts glass solder powder, and one part of a graphite suspension. The glass solder has a lower melting point than the melting glass, and the correct conductivity of the triggering line 5, and the required electrical contact with the electrodes 1 and 2, is produced during the melting process.

The glass material which fuses to connect the insulator 3 with the electrodes 1 and 2 is preferably first sintered into the electrodes 1 and 2, after which the ceramic tube 3 is pressed into the glass within the annular depression in the electrodes 1 and 2. The triggering lines 5 are each applied to an end of the ceramic tube 3, as well as to the inside surface, and the portion of the line which overlies the end of the ceramic tube is in direct mechanical contact with the electrodes 1 and 2, thereby assuring good electrical contact between the electrodes and the triggering lines.

Figure 2:
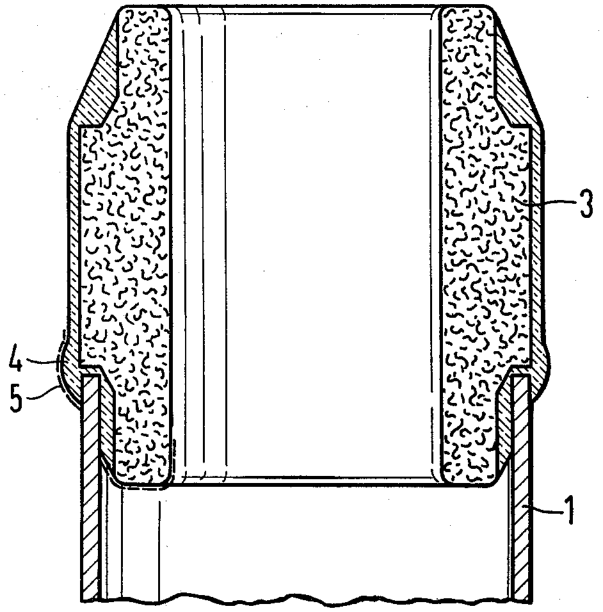
FIG. 2 is a partial cross-sectional view of a portion of an over voltage arrester incorporating an alternative embodiment of the present invention.

In FIG. 2, an alternative form of the present invention is shown, in which the over voltage arrester is formed with its electrode 1' connected to the tubular insulator member 3, which is formed of glazed ceramic material.

In the embodiment of FIG. 2 the triggering line 5 is formed preferably of a mixture of low melting glass solder and a graphite suspension, and is applied to the exterior of the glazed ceramic insulator member 3. During the melting process, by which the electrode 1 is joined with the insulator 3, the electrode 1 cuts through the triggering line 5 and thus comes into intimate contact with the triggering line in the area of the joint between the electrode 1 and the insulator 3. Good electrical contact between the triggering line 5 and the electrode 1 is assured during the melting process, because of the acute angle between the triggering line 5 and the electrode 1.

Figure 3:
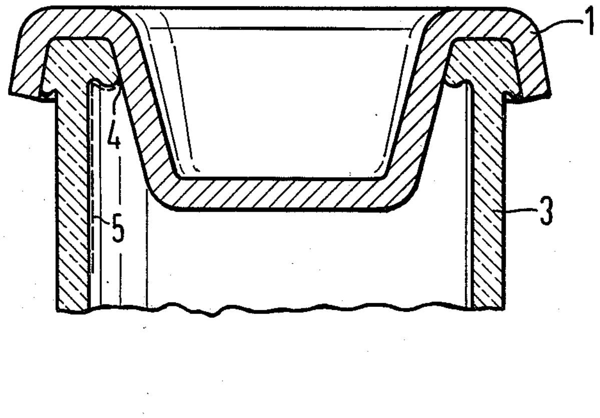
FIG. 3 is a cross-sectional view of a portion of an over voltage arrester constructed in accordance with another embodiment of the present invention.

In FIG. 3 a slightly different form of the present invention is illustrated, in which the electrode 1 is associated with an insulating tube 3 formed of glass. The triggering line 5 again consists of a mixture of glass solder and a graphite suspension, or alternatively consists of the graphite suspension alone. The line 5 applied to the inside surface of the glass tube 3, and extends at around the inner surface of a flange 6 formed at the extremity of the tube 3. The inner surface of the flange 6 cooperates with a conical surface 7 of the electrode 1 that as the electrode 1 is pushed toward the insulator member 3 in an axial direction, the electrode 1 is urged into direct mechanical contact with the line 5 in the area of the joint between the tube 3 and the electrode 1, where the glazing takes place.

When the insulating tube 3 is formed of pure glass, a particularly good adherence between the triggering line 5 and the insulator 3 must be obtained, because of the pushing process during assembly with the electrode 1. When the line 5 is formed of a mixture of glass solder and graphite suspension, they remain firmly attached to the insulator 3 during the melting process and therefore do not chip off.

If the graphite suspension alone is used to form the triggering line, the inner wall of the glass insulator 3 is preferably first made rougher by means of etching or the like, in order to obtain a good adherence of the graphite which forms the line 5.

When the tubular insulator member 3 is formed of ceramic material, which unlike glass does not change its shape during the process of glazing or fusing the tube 3 to the electrodes, it is advantageous to form the triggering line 5 by means of abrasion from a member made of solid electrically conductive substance such as a graphite pencil. The interior surface of the ceramic tube 3 is rough enough to cause the graphite material to be detached from the pencil and adhere to the inner surface of the tube 3. The hardness of the graphite of the pencil may be selected in order to obtain the desired resistance for the triggering lines 5.

The graphite suspension referred to above, may be of the type known as hydrokollag, defined in Roempp's Chemical Dictionary, published in 1966 by Frank Verlagshandlung, as a suspension of collodial graphite in water with a protection colloid which avoids clumping or flaking of the graphite when it is deposited. The glass solder referred to above is preferably a conventional glass solder in powder form.

What is claimed is:

1. An over voltage arrester formed with a gas-tight housing having a pair of electrodes supported at opposite ends of a tubular insulator member, at least one of said electrodes being in electrical contact with a strip of electrically conductive material supported on the surface of said tubular insulator and extending from said one electrode toward the other electrode, said electrodes being fused by a glazed connection to the ends of said tubular member, and said strip being in direct contact with said electrode in the area of the glazed connection between said electrodes and said tubular member.

2. Apparatus according to claim 1 wherein said conductive strip is formed of graphite.

3. Apparatus according to claim 1 wherein said strip is formed of a mixture of low melting glass solder and a graphite suspension.

4. Apparatus according to claim 3, wherein said strip consists of three parts of glass solder powder and one part graphite suspension.

5. Apparatus according to claim 1, wherein said tubular insulator member is formed of glass.

6. Apparatus according to claim 1, wherein said tubular member is formed of ceramic material.

7. Apparatus according to claim 1, wherein said surface is the inner surface of said tubular member.

8. Apparatus according to claim 1, wherein said tubular insulator member is formed of ceramic material and said conductive strip is formed of a body of a solid electrically conductive material.

9. Apparatus according to claim 8, wherein said solid electrically conductive body is formed of graphite.

* * * * *

REEXAMINATION CERTIFICATE (919th)

United States Patent [19]

Lange et al.

[11] B1 3,959,696

[45] Certificate Issued Sep. 20, 1988

[54] OVER VOLTAGE ARRESTER

[75] Inventors: Gerhard Lange; Gerhard Peche, both of Berlin, Fed. Rep. of Germany

[73] Assignee: Siemens Aktiengesellschaft, Berlin & Munich, Fed. Rep. of Germany

Reexamination Request:
No. 90/001,316, Aug. 26, 1987

Reexamination Certificate for:

| | |
|---|---|
| Patent No.: | **3,959,696** |
| Issued: | **May 25, 1976** |
| Appl. No.: | **330,886** |
| Filed: | **Feb. 8, 1973** |

[30] Foreign Application Priority Data

Feb. 15, 1972 [DE] Fed. Rep. of Germany ....... 2207009

[51] Int. Cl.[4] .......................... H02H 1/04; H02H 9/06
[52] U.S. Cl. .................................... 361/120; 313/596
[58] Field of Search ....................... 361/54, 56, 88, 91, 361/111, 117, 118, 120, 126, 127; 313/596

[56] References Cited

U.S. PATENT DOCUMENTS

| | | | |
|---|---|---|---|
| 2,365,517 | 12/1944 | Berkey | 250/27.5 |
| 2,478,119 | 8/1949 | Mitchel | 250/27.5 |
| 2,938,137 | 5/1960 | Reger et al. | 313/596 |
| 3,588,576 | 6/1971 | Kawiecki | 313/306 |
| 3,676,743 | 7/1972 | Bahr et al. | 361/120 |
| 3,739,230 | 6/1973 | Lange | 361/120 |
| 3,989,985 | 11/1976 | Lange et al. | 361/120 |

FOREIGN PATENT DOCUMENTS

| | | |
|---|---|---|
| 1070733 | 10/1959 | Fed. Rep. of Germany . |
| 1089482 | 9/1960 | Fed. Rep. of Germany . |

*Primary Examiner*—A. D. Pellinen

[57] ABSTRACT

An over voltage arrester is formed with electrodes inserted into the ends of a tubular insulator member and assembled in gas-tight relationship by glazing the electrodes to the insulator member, at least one of the electrodes being in direct electrical contact with a conductive triggering strip supported on the tubular insulator member, such triggering strip being in direct contact with the electrode in the area of the glazed connection between the electrode and the insulator member.

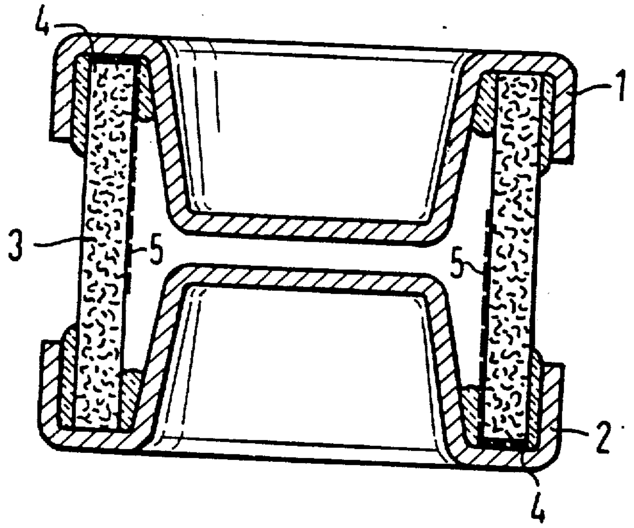

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *